Sept. 10, 1957 M. R. HANNAPEL Re. 24,354

MECHANICAL AUTOMATIC COUPLERS

Original Filed Nov. 3, 1950 2 Sheets-Sheet 1

INVENTOR
MARTIN R. HANNAPEL
BY
L. S. Saulsbury
ATTORNEY

MECHANICAL AUTOMATIC COUPLERS
Original Filed Nov. 3, 1950 2 Sheets-Sheet 2
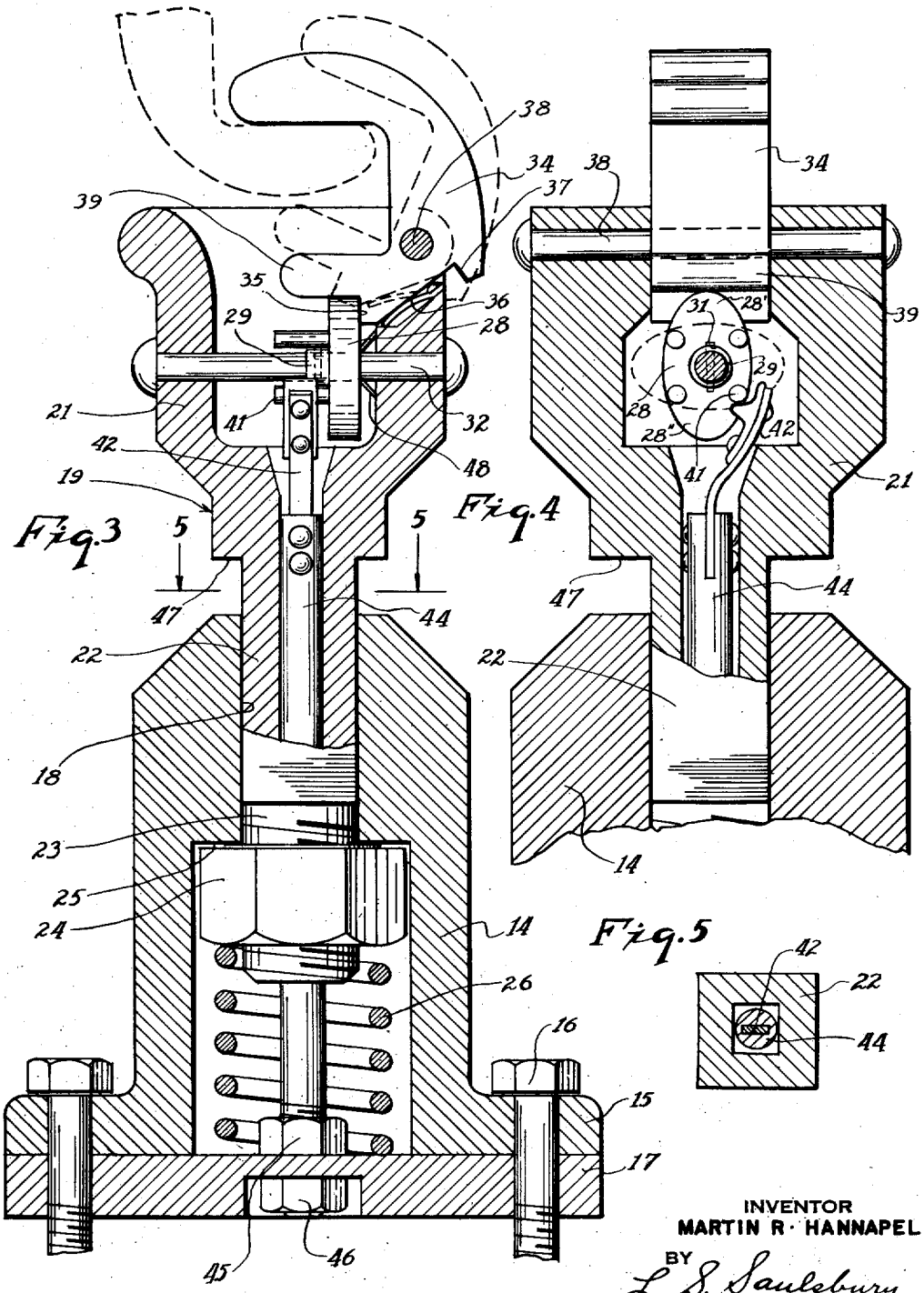
INVENTOR
MARTIN R. HANNAPEL
BY
L. S. Saulsbury
ATTORNEY United States Patent Office Re. 24,354

Reissued Sept. 10, 1957

24,354

MECHANICAL AUTOMATIC COUPLERS

Martin R. Hannapel, Oaklawn, Ill.

Original No. 2,677,916, dated May 11, 1954, Serial No. 193,799, November 3, 1950. Application for reissue May 20, 1955, Serial No. 510,064

9 Claims. (Cl. 213—212)

Matter enclosed in heavy brackets [ ] appears in the original patent but forms no part of this reissue specification; matter printed in italics indicates the additions made by reissue.

This invention relates to an automatic coupler device.

A primary object of this invention is the provision of an improved coupler for use with model railroad trains, and specifically adapted for electrically driven trains of this type whereby a car or cars may be coupled to or uncoupled from the engine at any position in the track layout.

As conducive to a clearer understanding of this invention it may be pointed out that automatic couplers for model trains have heretofore been known, but these couplers have been subject to the uniform disadvantage that they were operable only at specific predetermined positions in the track layout, being operated by special sections of track, which incorporated either a voltage change or electrical actuation of the coupler, or a ramp for mechanical actuation thereof or similar devices. A further important object of this invention is, therefore, a provision of a mechanically operated automotive coupler which will couple or uncouple at any position in the track layout regardless of any operated mechanism exterior of the coupling itself.

A more specific object of the present invention is to provide a coupler device of this character which is fully automatic in operation, wherein the coupling and uncoupling of the units can be effected automatically by movement of the draw bar element to operate a cam lock which can be set to either hold or release the jaw element, the draw bar being normally extended under the action of a compression spring extending between the draw bar and the frame of the unit.

Other objects of the present invention are to provide an automatic coupling device of this character which is of simple construction, has a minimum number of parts, is easy to assemble, compact, and safe and efficient in operation.

For other objects and for a better understanding of the invention, reference may be had to the following detailed description taken in connection with the accompanying drawing, in which—

Fig. 3 is an enlarged sectional view taken on line 3—3 of Fig. 1 and looking in the direction of arrows 3—3 thereof.

Fig. 4 is a fragmentary sectional view taken on the same line as Fig. 3 is taken, but looking in the direction of arrows 4—4 thereof.

Fig. 5 is a transverse sectional view taken on line 5—5 of Fig. 3.

Figure 1:
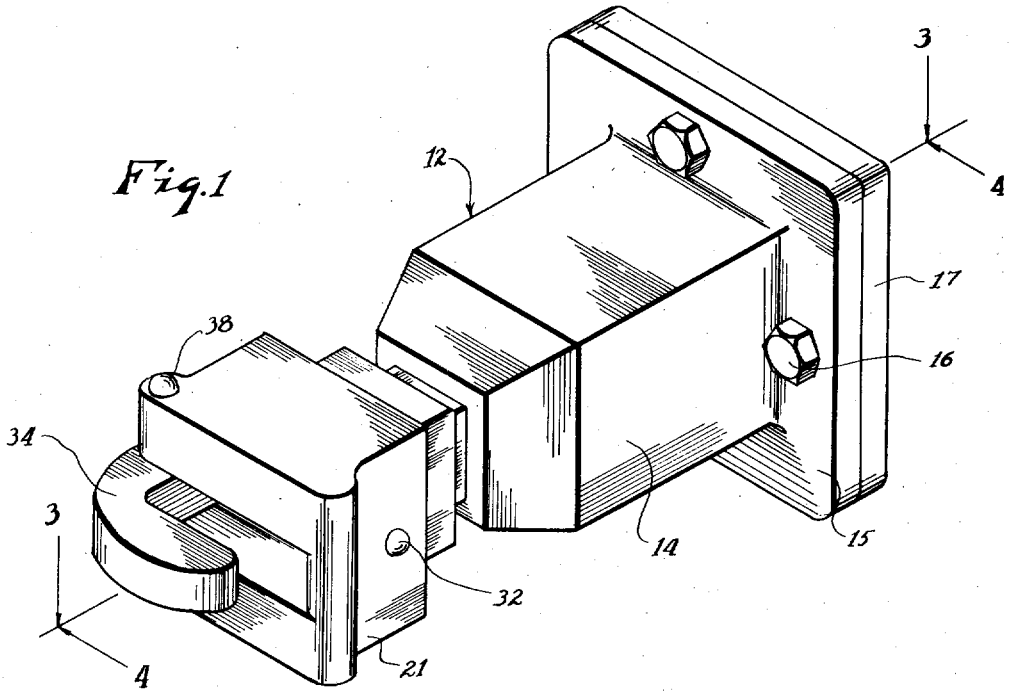
Fig. 1 is a perspective view of the coupling device embodying the features of the present invention.
Figure 2:
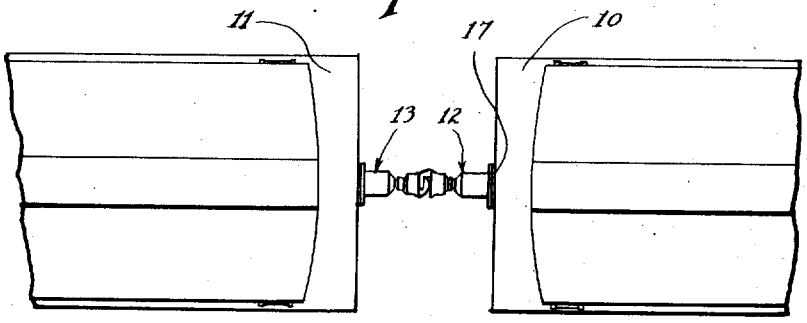
Fig. 2 is a top fragmentary plan view of two units having the coupler device and these units being joined together by the coupling devices.

Referring now to the figures and particularly Figs. 2, 10 and 11 represent respectively freight car units having respectively coupling devices 12 and 13 of the present invention joined together so that movement of one unit will be imparted to the other unit. Such coupling device is shown generally in Fig. 1 and generally comprises a frame 14 having a flange 15 at one end which is connected by bolts 16 to a flange plate 17 normally provided on the freight car unit. The frame 14 is of square shape and has a small square opening 18 through which a draw bar 19 is slidable. This draw bar has a hollow head 21 and a square shank portion 22 which is slidable in the opening 18 of the frame 14. The square shank portion 22 has a threaded projection 23 on which is adjustable nut 24 adapted to engage a shoulder 25 on the interior of the frame to assume the pull of the draw bar.

Reacting between the nut 24 and plate 17 is a large compression spring 26 which normally forces the draw bar outwardly and maintains the nut 24 upon the shoulder 25.

The head of the draw bar is hollow and within the same is a latch cam 28. This cam has a sleeve projection 29 through which extends a pin 31 that secures the cam to a pivot bolt 32 which extends through the enlarged head 21. This bolts is headed at its opposite ends and while being able to rotate within the head 21 is held against axial displacement therefrom.

The cam 28 has two lobes 28' and 28'' diametrically opposite from each other which, when extending vertically in the manner shown in Figs. 3 and 4, will prevent the outward pivotal displacement of jaw 34 because of the abutment of shoulder 35 with the side of the cam lobe. If the cam 28 is turned ninety degrees to a position as shown in dotted lines in Fig. 4, the jaw element 34 is released and under action of a small spring 36, the jaw is moved to an open or dotted line position shown in Fig. 3. The jaw has a second stop 37 which will abut with the side of the head 21 to limit the outward pivotal movement of the jaw. The jaw 34 is pivotally mounted upon the head 21 by pivot shaft 38. The jaw 34 has a projection 39 with which the jaw of another coupling device can engage to spring inwardly the jaw 34 in order to permit the cam 28 to be rotated so that the lobes 28' and 28'' are again extended to receive the shoulder 35 of the jaw 34.

In order to turn the cam 28, the cam has a plurality of pins 41 extending laterally therefrom and arranged as if in the corners of a square. A resilient pawl 42 will engage as pins 41, one at a time, as the draw bar 19 is moved inwardly against the action of the spring 26. This pawl 42 is mounted on the outer end of a rod 44 secured by lock nuts 45 and 46 to the plate 17. The draw bar will slide over the rod 44 and the pawl 42 will cause the rotation of the cam 28 to present the lobes 28' and 28'' on each half turn of the cam and alternately, but with two movements of the draw bar. *Thus, on the inner movement of the draw bar, the cam will be moved a quarter-turn by the advance of the pin 41 seen above the pawl 42 in Fig. 4; and on the outer movement of the draw bar, the pin next behind the one advanced will trip the pawl to assume the initial position of the previous pin.* The jaw 34 is either released and moved to its open position or it is held in its closed position by the cam 28.

The inward movement of the tractor draw bar is limited by the engagement of a shoulder 47 on the head thereof with the outer end of the frame 14. The amount of this movement can be controlled by the adjustment of the nut 24 upon the threaded projection 23 of the shank 22 of the draw bar. A friction disc 48 upon the pivot bolt 32 engages with the side of the cam 28 and with the wall of the recess within the hollow head 21 of the draw bar, Fig. 3, to hold the cam against free turning within the head 21.

If the coupling devices of the units 10 and 11 are disengaged and the jaws are in their open positions, engagement of the jaw elements will cause the jaw elements to be pivoted inwardly and the respective cams of the devices moved to their positions to retain the jaw elements locked against outward displacement as the slack in the devices is taken up. Upon the next inward abutment of the devices and more particularly the draw bars thereof, the cams of the respective devices will be moved a quarter turn to free the jaw elements and allow the car units to be decoupled from each other. The propelling engine then can thereby, with its action upon the car units, control the coupling and uncoupling of these units. Upon successive movements of the draw bar 19 inwardly against the action of the spring 26, the cam 28 alternately latches and releases the jaw element 34. Such action is automatic upon the collision of the car units.

While various changes may be made in the detail construction, it shall be understood that such changes shall be within the spirit and scope of the present invention as defined by the appended claims.

I claim:

*1.* A coupling device comprising a frame piece having a hollow opening extending axially therethrough, said frame piece having a flange on one end, a plate connected to said flange, a draw bar having a hollow head and a square shank portion, said shank portion being adjustable in the axial opening in the frame piece and having a threaded projection, an adjustable nut on said threaded projection, said frame piece having a shoulder engageable by the adjustable nut to limit the outward displacement of the draw bar, a compression spring acting between the base plate and the adjustable nut to normally urge the outward displacement of the draw bar, said draw bar having a longitudinal opening, a rod adjustably secured to said base plate and extending through the longitudinal opening of the draw bar, a jaw element pivotally connected to the draw barhead, spring means reacting between the jaw element and the head to urge the outward displacement of the jaw element, said jaw element having a shoulder portion engaging with the draw bar head to limit the outward displacement of the jaw element, a cam having diametrically opposite lobes thereon, means pivotally connecting said cam to the draw bar head to extend transversely thereof, said jaw element having a shoulder adapted to engage with the side of the cam lobes, one at a time, whereby to retain the jaw element in its closed position, four pins extending from the side of the cam element and arranged as if in the corners of a square, a pawl secured to the outer end of said fixed rod that extends through the opening in the draw bar and engageable in succession with the laterally extending pins of the cam whereby upon the inward and outward movement of the draw bar the cam will be stepped alternately through latch and release positions to retain or free the jaw element.

*2. An automatic coupling for a pair of vehicles situated along a course of travel comprising coacting coupling devices carried by the vehicles, the coupling device of each vehicle comprising a frame, a draw bar reciprocable longitudinally relative to the frame, means normally urging the draw bar into the advanced position, a coupling jaw carried by the draw bar, means normally maintaining the jaw in the open position, the jaws of the coupling devices adapted to be closed in coupling relation on the engagement of the vehicles, such engagement transmitted by the jaws to the respective draw bars with the effect of backing them, and second means operated by the backing of the draw bars to lock the jaws in the closed position.*

*3. An automatic coupling for a pair of vehicles situated along a course of travel comprising coacting coupling devices carried by the vehicles, the coupling device of each vehicle comprising a frame, a draw bar reciprocable longitudinally relative to the frame, means normally urging the draw bar into the advanced position, a coupling jaw carried by the draw bar, means locking the jaws when in the closed position to maintain the vehicles in coupled relation when one draws the other, and second means operating the first means to unlock the jaws when the backing movement of one vehicle against the other acts through the jaws to back the respective draw bars.*

*4. An automatic coupling for a pair of vehicles situated along a course of travel comprising coacting coupling devices carried by the vehicles and defining jaws, each coupling device having means for closing the jaws when one vehicle engages the other with a coupling action, whereby either vehicle may serve to draw the other, and second means for locking the jaws when they are closed as stated, said second means also effective to unlock the jaws on a subsequent engaging movement of the vehicles, and third means for opening the jaws in such event, each coupling device including a frame, and said second means comprising a draw bar normally in forwardly extended position relative to the frame and adapted to be backed by the engaging action of the vehicles, elements carried by the draw bars in positions clearing the jaws when these are closed while the draw bar is in the forward position, and abutments adapted to move said elements into positions obstructing the opening of the jaws when the vehicles engage beyond the coupling stage.*

*5. An automatic coupling for a pair of vehicles situated along a course of travel comprising coacting coupling devices carried by the vehicles and defining jaws, each coupling device having means for closing the jaws when one vehicle engages the other with a coupling action, whereby either vehicle may serve to draw the other, and second means for locking the jaws when they are closed as stated, said second means also effective to unlock the jaws on a subsequent engaging movement of the vehicles, and third means for opening the jaws in such event, each coupling device including a frame, and said second means comprising a draw bar normally in forwardly extended position relative to the frame and adapted to be backed by the engaging action of the vehicles, elements carried by the draw bars in positions clearing the jaws when these are closed while the draw bar is in the forward position, and abutments adapted to move said elements into positions obstructing the opening of the jaws when the vehicles engage beyond the coupling stage, said abutments also effective to return the elements to the jaw-clearing positions on the backing of the draw bars during a subsequent engagement of the vehicles.*

*6. An automatic coupling for a pair of vehicles situated along a course of travel comprising coacting coupling devices carried by the vehicles and defining jaws, each coupling device having means for closing the jaws when one vehicle engages the other with a coupling action, whereby either vehicle may serve to draw the other, and second means for locking the jaws when they are closed as stated, said second means also effective to unlock the jaws on a subsequent engaging movement of the vehicles, and third means for opening the jaws in such event, each coupling device including a frame, and said second means comprising a draw bar normally in extended position relative to the frame and adapted to be backed by the engaging action of the vehicles, elongated rotary cams journaled in the draw bars and clearing the jaws in positions crosswise of the draw bars when the jaws are closed while the draw bars are in the extended position, and frame abutments effective to rotate the cams to longitudinal positions placing their end portions to obstruct the opening of the jaws on the engagement of the vehicles beyond the coupling stage.*

*7. An automatic coupling for a pair of vehicles situated along a course of travel comprising coacting coupling devices carried by the vehicles and defining jaws, each coupling device having means for closing the jaws when one vehicle engages the other with a coupling action, whereby either vehicle may serve to draw the other, and second means for locking the jaws when they are closed*

*as stated, said second means also effective to unlock the jaws on a subsequent engaging movement of the vehicles, and third means for opening the jaws in such event, each coupling device including a frame, and said second means comprising a draw bar normally in extended position relative to the frame and adapted to be backed by the engaging action of the vehicles, elongated rotary cams journaled in the draw bars and clearing the jaws in positions crosswise of the draw bars when the jaws are closed while the draw bars are in the extended position, circularly-spaced stops on the cams, and pawls carried by the frames effective to impinge on one of said pins and rotate the cams to longitudinal positions placing their end portions to obstruct the opening of the jaws on the backing of the draw bars during the engagement of the vehicles beyond the coupling stage, said pawls being cleared by the cams and tripped by the succeeding pin in the rotary course thereof when the draw bars are returned to their forward positions by the drawing of one vehicle by the other.*

*8. An automatic coupling for a pair of vehicles situated along a course of travel comprising coacting coupling devices carried by the vehicles and defining jaws, each coupling device having means for closing the jaws when one vehicle engages the other with a coupling action, whereby either vehicle may serve to draw the other, and second means for locking the jaws when they are closed as stated, said second means also effective to unlock the jaws on a subsequent engaging movement of the vehicles,*

*and third means for opening the jaws in such event, each coupling device including a frame, said second means comprising a draw bar carried by the frame and reciprocable between forward and rear positions, elements carried by the draw bars in positions clearing the jaws when these are closed while the draw bars are in the forward position, abutments adapted to move said elements into positions obstructing the opening of the jaws when the vehicles engage beyond the coupling stage, and yieldable means normally urging the draw bars into the forward position.*

*9. Means for automatically locking a pair of vehicles in coupled relation comprising a longitudinally reciprocable draw bar carried by each vehicle, coacting coupling jaws carried by the draw bars and coupled on the engagement of one vehicle with the other, such engagement transmitted by the jaws to the respective draw bars with the effect of backing them and controls carried by the draw bars and actuated by the receding movement thereof to bar the uncoupling movement of said jaws.*

References Cited in the file of this patent or the original patent.

UNITED STATES PATENTS

| | | |
|---|---|---|
| 1,580,869 | Tomlinson | Apr. 13, 1926 |
| 2,408,877 | Pinder | Oct. 8, 1946 |
| 2,658,629 | Pettit | Nov. 10, 1953 |